US012783006B2

(12) United States Patent
Han

(10) Patent No.: US 12,783,006 B2
(45) Date of Patent: Nov. 3, 2026

(54) DISPLAY DEVICE

(71) Applicant: Wuhan China Star Optoelectronics Semiconductor Display Technology Co., Ltd., Wuhan (CN)

(72) Inventor: Wen Han, Wuhan (CN)

(73) Assignee: Wuhan China Star Optoelectronics Semiconductor Display Technology Co., Ltd., Wuhan (CN)

(*) Notice: Subject to any disclaimer, the term of this patent is extended or adjusted under 35 U.S.C. 154(b) by 692 days.

(21) Appl. No.: 17/262,764

(22) PCT Filed: Oct. 22, 2020

(86) PCT No.: PCT/CN2020/122983
§ 371 (c)(1),
(2) Date: Apr. 27, 2023

(87) PCT Pub. No.: WO2022/062014
PCT Pub. Date: Mar. 31, 2022

(65) Prior Publication Data

US 2023/0251688 A1 Aug. 10, 2023

(30) Foreign Application Priority Data

Sep. 27, 2020 (CN) ......................... 202011031435.4

(51) Int. Cl.
*G06F 1/16* (2006.01)

(52) U.S. Cl.
CPC .......... *G06F 1/1618* (2013.01); *G06F 1/1624* (2013.01)

(58) Field of Classification Search
CPC ............. H04M 1/0237; H04M 1/0268; H04M 1/0295; H04M 1/0233
See application file for complete search history.

(56) References Cited

U.S. PATENT DOCUMENTS

| | | | | |
|---|---|---|---|---|
| 2004/0183958 | A1 | 9/2004 | Akiyama et al. | |
| 2018/0375054 | A1 | 12/2018 | Wang et al. | |
| 2019/0131553 | A1* | 5/2019 | Park | G06F 1/1652 |
| 2019/0197281 | A1* | 6/2019 | Choi | H10K 59/65 |
| 2019/0230803 | A1* | 7/2019 | Liao | H05K 5/0221 |
| 2020/0068725 | A1* | 2/2020 | Park | H05K 5/0017 |
| 2020/0241594 | A1* | 7/2020 | Cavallaro | B32B 7/12 |
| 2020/0304613 | A1* | 9/2020 | Cha | G06F 1/1652 |

FOREIGN PATENT DOCUMENTS

| | | | |
|---|---|---|---|
| CN | 106128312 | A | 11/2016 |
| CN | 108519795 | A | 9/2018 |
| CN | 208044998 | U | 11/2018 |

(Continued)

OTHER PUBLICATIONS

CN 111613144 English translation (Year: 2020).*

*Primary Examiner* — Anthony Q Edwards
(74) *Attorney, Agent, or Firm* — Nathan & Associates; Menachem Nathan

(57) ABSTRACT

A display device is provided, which includes a flexible display screen and a curling device. The flexible display screen includes a metal plate, all or a part of the metal plate is provided with a pattern region, and the metal plate is curlable in the pattern region. The flexible display screen corresponding to the pattern region is completely wound on the curling device or partially wound on the curling device.

20 Claims, 6 Drawing Sheets

(56) References Cited

FOREIGN PATENT DOCUMENTS

| | | | | | |
|---|---|---|---|---|---|
| CN | 109618033 | A | | 4/2019 | |
| CN | 110491289 | A | | 11/2019 | |
| CN | 110718154 | A | | 1/2020 | |
| CN | 210627729 | U | | 5/2020 | |
| CN | 111243438 | A | | 6/2020 | |
| CN | 111383539 | A | | 7/2020 | |
| CN | 111489651 | A | | 8/2020 | |
| CN | 111613144 | A | * | 9/2020 | ............. B65H 75/04 |
| CN | 111664337 | A | | 9/2020 | |
| KR | 20170025520 | A | | 3/2017 | |
| KR | 20170136951 | A | | 12/2017 | |
| KR | 20170143144 | A | | 12/2017 | |

* cited by examiner

DISPLAY DEVICE

FIELD OF INVENTION

The present invention relates to the field of displays, in particular to a display device.

BACKGROUND OF INVENTION

Flexible display screen device application market is becoming more and more popular in the market. Flexible screen mobile phones refer to mobile phones with bendable and flexible screens. Compared with traditional screens, flexible screens have obvious advantages of being not only thinner and more lightweight in size, but also lower in power consumption than that of conventional devices, which are beneficial to improving endurance of a device. Meanwhile, based on their bendable and flexible characteristics, their durability is much higher than that of conventional screens, reducing a probability of accidental damage to the device.

In order to realize a folding function of the flexible screens, in addition to the screens themself, a connection component configured to realize the folding, that is, a connecting shaft design at a bending position is also the biggest technical problem. An opening mode of current flexible screens is mostly folded outwardly and folded inwardly.

SUMMARY OF INVENTION

Technical Problems

The purpose of the present invention is to solve technical problems of single opening mode of a flexible screen and poor folding effect of a flexible display screen device in a conventional art.

Solutions to Technical Problem

Technical Solutions

In order to achieve the above object, the present invention provides a display device, including a flexible display; and a curling device installed in the flexible display; wherein the flexible display includes a metal plate, all or a part of the metal plate is provided with a pattern region, the metal plate is curlable in the pattern region; and the flexible display corresponding to the pattern region is completely wound on the curling device or partially wound on the curling device.

Furthermore, the display device further including an electromagnet structure disposed in the curling device, wherein the metal plate is magnetic, and after the flexible display is stretched, the electromagnet structure is energized to magnetically adsorb and fix the metal plate.

Furthermore, a modulus of the pattern region ranges from 0.2 MPa to 10 MPa.

Furthermore, the curling device includes support plates including a first support plate and a second support plate engaged with each other in a staggered manner; and a reel arranged on a side of the first support plate away from the second support plate, wherein the flexible display is wound on the reel and extends from the reel to surfaces of the support plates; wherein when the first support plate and the second support plate are completely engaged with each other, the flexible display forms a first display surface, and when the first support plate and the second support plate are expanded mutually, the flexible display stretches from the reel to form a second display surface.

Furthermore, the curling device further includes at least one guide rail arranged perpendicular to the reel; a sliding shaft slidably mounted to the at least one guide rail; and a constant-force coil spring installed on the sliding shaft, wherein an end of the constant-force coil spring is fixed to a fixing piece.

Furthermore, the display device further including a housing, wherein the reel is installed in the housing and is connected to the housing, the first support plate is fixed in the housing, the second support plate is slidably arranged on the first support plate, and the at least one guide rail is fixed on a side of the first support plate facing the housing or a side of the housing facing the first support plate; and a side housing fixed on a side of the second support plate away from the first support plate, wherein a side of the flexible display is fixed between the side housing and the second support plate.

Furthermore, a thickness of the metal plate ranges from 0.02 mm to 5 mm.

Furthermore, a number of openings are defined on the pattern region, and shapes of the openings in each of column or each of row are same.

Furthermore, the flexible display further includes a substrate disposed on a surface of the metal plate away from the curling device; an adhesive layer disposed between the substrate and the metal plate; and a force-receiving layer disposed on a surface of the substrate away from the adhesive layer.

Furthermore, an end of the force-receiving layer is curled and attached to the sliding shaft, and another end is attached to an inner sidewall of the side housing.

Advantageous Effect of Invention

Advantageous Effect

The technical effect of the present invention is that a combined structure of the constant-force coil spring and the sliding shaft is adopted to realize a stretching and curling of the flexible display screen. During this process, the flexible display screen is always in a tensioned state to ensure a flatness of its surface, and to ensure that it has a good display effect. The stretching of the flexible display screen enables the display device to have a large effective display region, which increases applicable scenarios of the display device, and improves a utilization rate of the display device. At the same time, the display device has a good portability in an enrolled state. A top of the flexible display screen is coated with a thermoplastic urethane (TPU) material that can be replaced and maintained at any time, which fully protects the display device from external damage.

BRIEF DESCRIPTION OF FIGURES

Description of Figures

Figure 1:
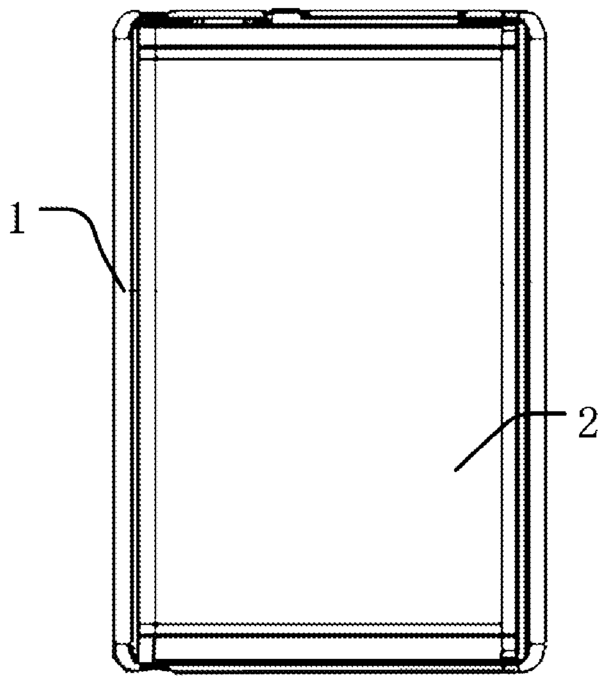

FIG. 1 is a top view of a display device in an enrolled state according to an embodiment of the present invention.

Figure 2:
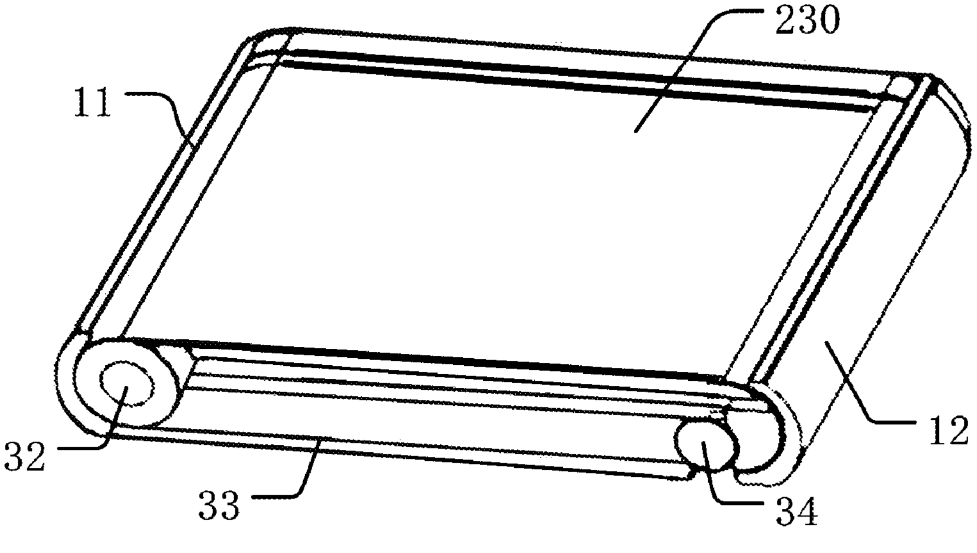

FIG. 2 is a side perspective view of the display device in the enrolled state according to an embodiment of the present invention.

Figure 3:
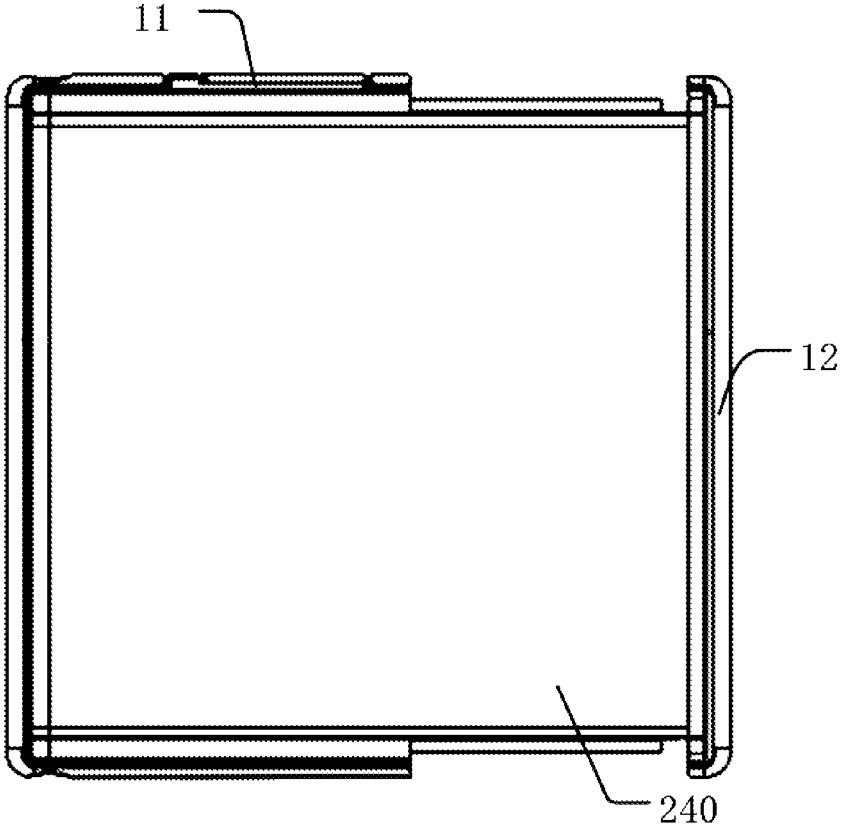

FIG. 3 is a top view of the display device in a stretched state according to an embodiment of the present invention.

Figure 4:
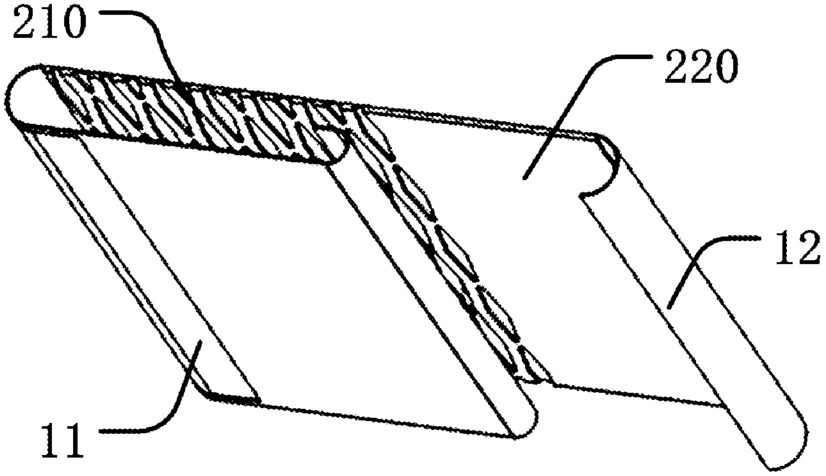

FIG. 4 is a side perspective view of a flexible display screen in the stretched state according to an embodiment of the present invention.

Figure 5:
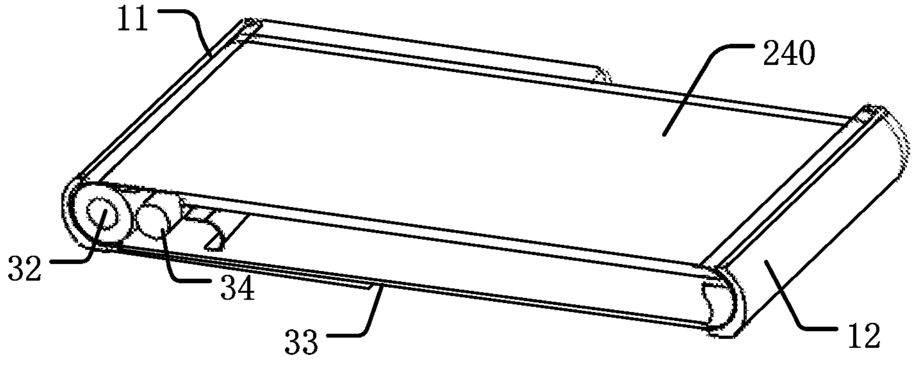

FIG. 5 is a side perspective view of the display device in the stretched state according to an embodiment of the present invention.

Figure 6:
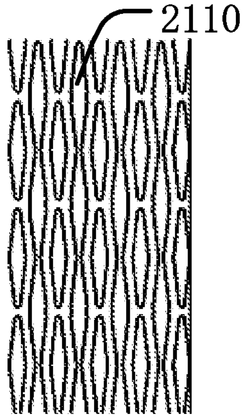

FIG. 6 is a schematic diagram of a pattern according to an embodiment of the present invention.

Figure 7:
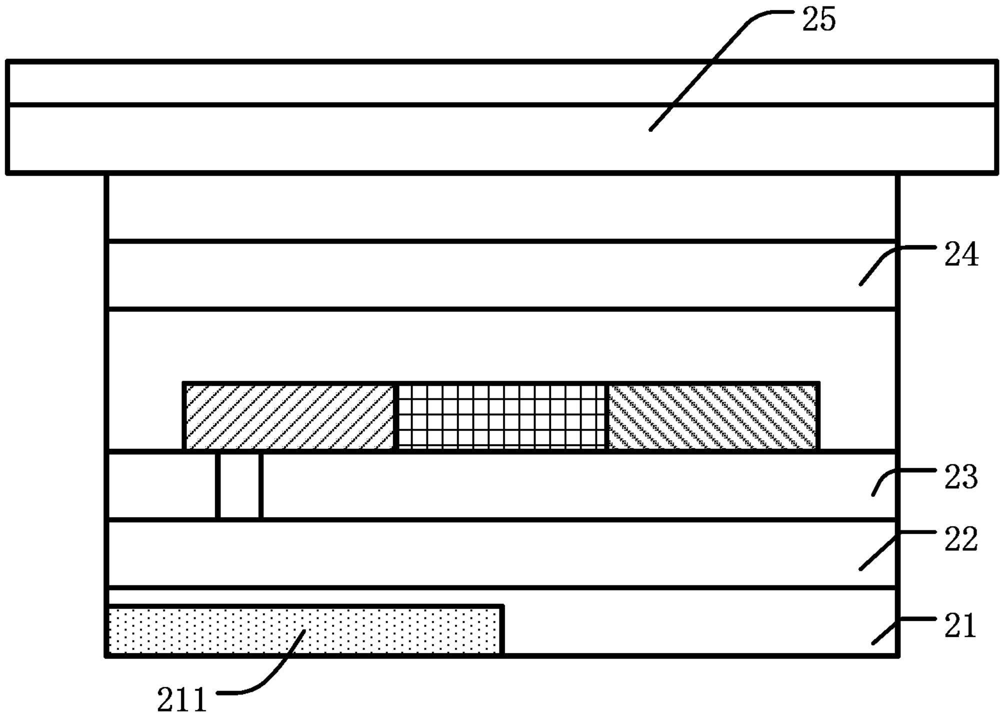

FIG. 7 is a structural diagram of the flexible display screen according to an embodiment of the present invention.

Figure 8:
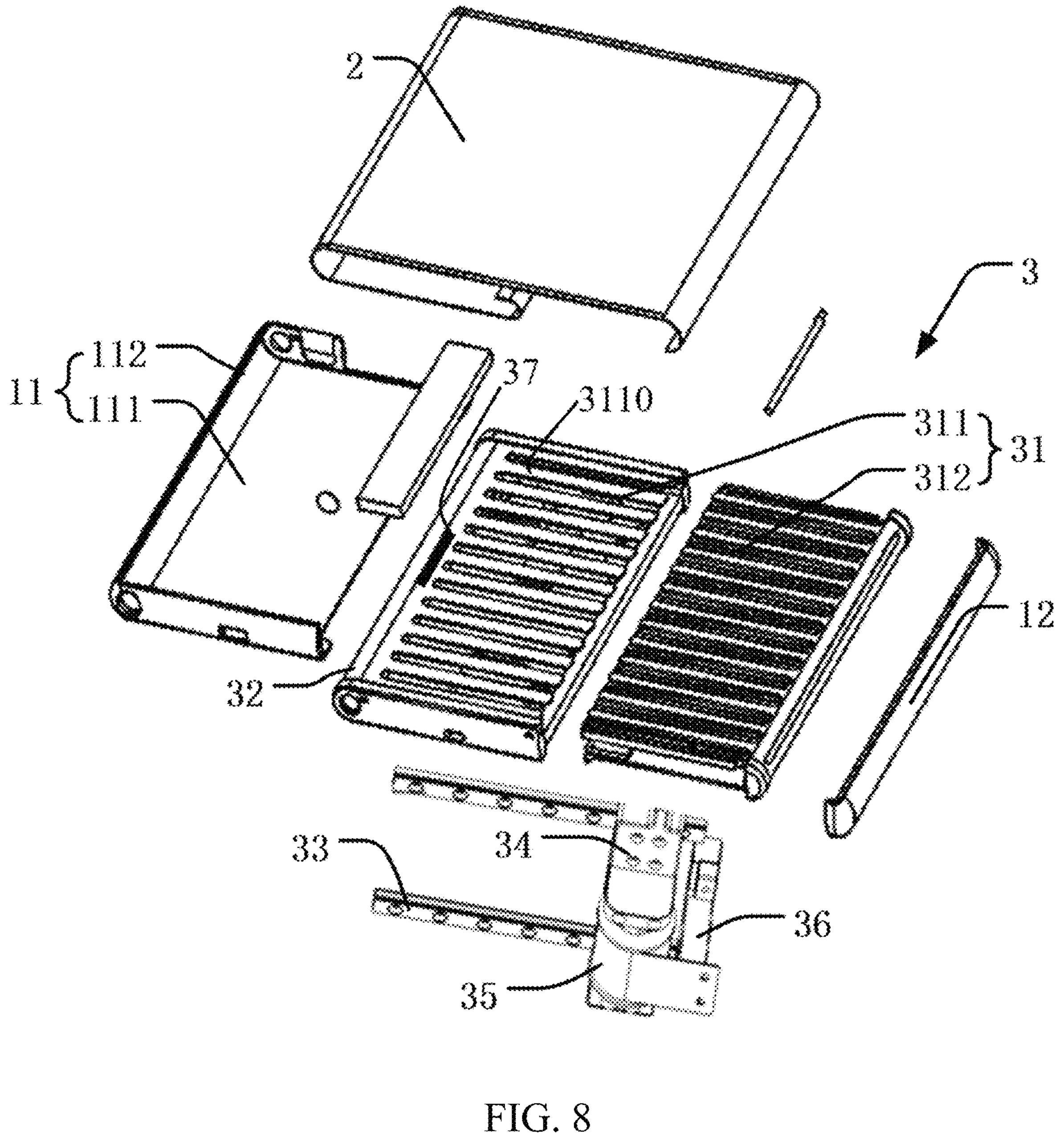

FIG. 8 is an exploded view of the display device according to the embodiment of the present invention.

Figure 9:
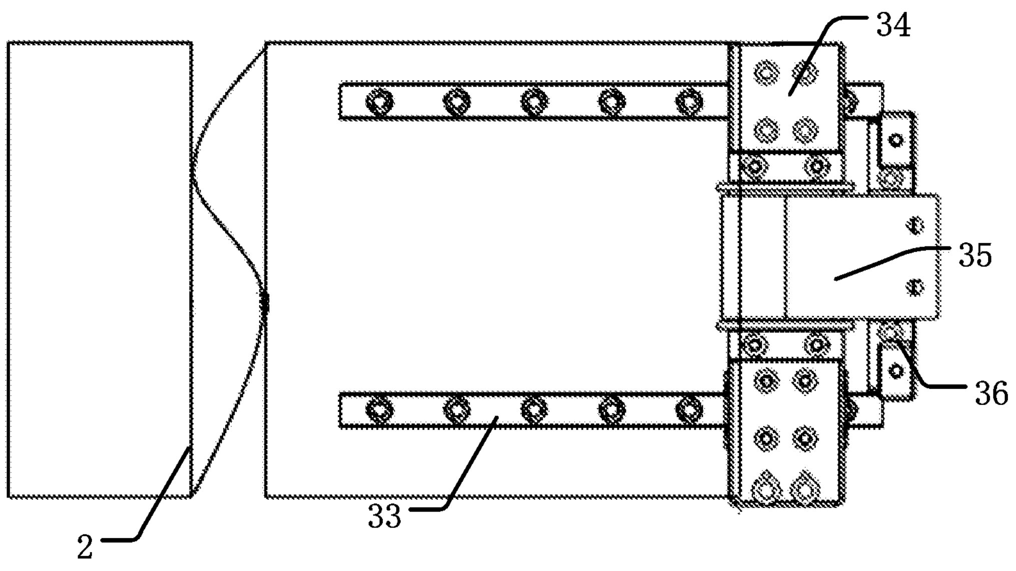

FIG. 9 is a schematic diagram of a curling device in the enrolled state according to an embodiment of the present invention.

Figure 10:
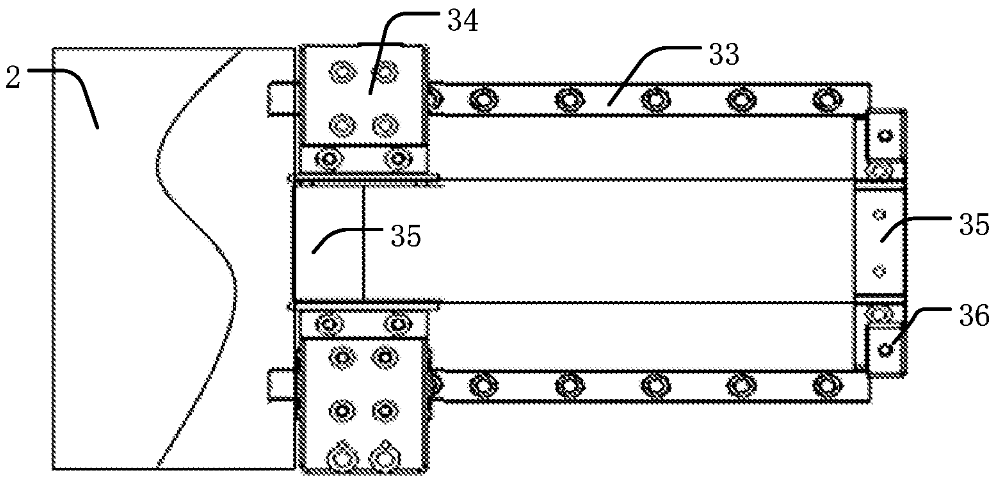

FIG. 10 is a schematic diagram of the curling device in the stretched state according to an embodiment of the present invention.

Some components are identified as follows:

1, housing; 2, flexible display screen; 3, curling device;
11, rear housing; 12, side housing;
111, bottom; 112, sidewall;
210, scrolling region; 220, plane region; 230, first display surface; 240, second display surface;
21, metal plate; 22, adhesive layer; 23, substrate; 24, polarizing layer; 25, force-receiving layer;
211, pattern region;
31, support plate; 32, reel; 33, guide rail; 34, sliding shaft; 35, constant-force coil spring; 36, fixing piece;
311, first support plate; and 312, second support plate.

EXAMPLES OF INVENTION

Embodiments of Invention

The technical solutions in the embodiments of the present invention will be clearly and completely described below in conjunction with the drawings in the embodiments of the present invention. Obviously, the described embodiments are only a part of the embodiments of the present invention, rather than all the embodiments. Based on the embodiments of the present invention, all other embodiments obtained by those skilled in the art without creative work shall fall within the protection scope of the present invention.

The following disclosure provides many different embodiments or examples for realizing different structures of the present invention. To simplify the disclosure of the present invention, the components and settings of specific examples are described below. Of course, they are only examples and are not intended to limit the invention. In addition, the present invention provides examples of various specific processes and materials, but those of ordinary skill in the art may be aware of the application of other processes and/or the use of other materials.

Specifically, refer to FIG. 1 to FIG. 10. An embodiment of the present invention provides a display device, including a housing 1, a flexible display screen 2, and a curling device 3. The display device is an outward expandable display device.

As shown in FIG. 2, the housing 1 includes a rear housing 11 and a side housing 12. The housing 1 functions as support and protection for the flexible display screen 2 and the curling device 3, and prevents them from external friction and collision.

As shown in FIG. 8, the rear housing 11 includes a bottom 111 and a sidewall 112. The bottom 111 is a transparent housing, the sidewall 112 is a curved surface and is disposed opposite to the side housing 12. Both ends of the sidewall 112 are defined with a through hole, and the through hole is configured to fix the curling device 3.

As shown in FIG. 3 and FIG. 4, the flexible display screen 2 is mounted on the rear housing 11. The flexible display screen 2 includes a scrolling region 210 and a plane region 220. The scrolling region 210 is a part where the display device can curl and slide, and is a key part of the display device to switch between a stretched and unfolded state and an enrolled state. In the stretched and unfolded state, a part of a display region of the scrolling region 210 provided on a back of the flexible display screen 2 is drawn to a front and displays together with the plane region 220 to form a second display surface 240 and expand a display area of the flexible display screen 2. The plane region 220 is a general display screen, which is in a display state when the display device is in the stretched and unfolded state and in the enrolled state. In the enrolled state, a front display screen is a first display surface 230.

As shown in FIG. 7, the flexible display screen 2 includes components such as a metal plate 21, an adhesive layer 22, a substrate 23, a polarizing layer 24, and a force-receiving layer 25.

The metal plate 21 is made of metal materials such as SUS, Ni alloy, has a thickness ranging from 0.02 millimeters (mm) to 5 mm, and has good magnetic properties. In the present embodiment, a part of the metal plate 21 corresponding to the plane region 220 is made of a rigid material, and a part of the metal plate corresponding to the scrolling region 210 is provided with a pattern region 211. In a process of sliding and curling the scrolling region 210, a surface of the flexible display screen 2 will be uneven, and a concave problem of partial pattern region 211 may appear. Because the metal plate 21 has good magnetism, a magnet is disposed inside the curling device 3 corresponding to the metal plate 21, which can firmly hold the metal plate 21 so that the metal plate 21 is kept flat. At this time, the metal plate 21 can support an entire surface of the flexible display screen 2 to prevent the flexible display screen 2 from being recessed and resulting in poor display effect.

As shown in FIG. 6, modulus of the pattern region 211 ranges from 0.2 MPa to 10 MPa, which an elastic elongation percentage is high, and it can participate in actions such as curling or unfolding support as a whole. The pattern region 211 is defined with a number of openings 2110. Shapes of the openings 2110 in each column or each row are same. The shapes of the openings 2110 in adjacent two of columns or adjacent two of rows are different. In the present embodiment, there are two shapes of the openings 2110 in the pattern region 211, one shape of the openings 2110 is a closed-loop quadrilateral, preferably a rhombus, and the other shape is a connected quadrilateral, that is, every two adjacent quadrilaterals are connected at included angles to form an entire row of openings 2110. The opening 2110 of this design improves elasticity and ductility of the pattern region 211 to a greater extent, which is beneficial to stretching and extending of the scrolling region 210 of the flexible display screen 2.

In other embodiments, the pattern region 211 can be provided on the metal plate 21 on an entire surface, and its overall modulus still ranges from 0.2 MPa to 10 MPa, which has good elastic elongation percentage.

The substrate 23 is disposed on the metal plate 21. The substrate 23 is a display panel, including thin film transistors, light-emitting layers, and other components. Wherein, an array layer where the thin film transistors are positioned is a foldable array layer, which corresponds to the plane region 220 and the scrolling region 210, which can realize a display function of the scrolling region 210.

The adhesive layer 22 is disposed between the metal plate 21 and the substrate 23, has good adhesion, and bonds the metal plate 21 and the substrate 23 together. The adhesive layer 22 is a laminated structure formed by stacking multiple layers of colloids, to ensure a flat bonding formed between the metal plate 21 and the substrate 23, and a display effect of the flexible display screen 2 is ensured.

The polarizing layer 24 is disposed on an upper surface of the substrate 23 to achieve a good polarizing effect and further improve the display effect of the flexible display screen 2.

The force-receiving layer 25 is disposed on an upper surface of the polarizing layer 24, and an optical adhesive layer can also be disposed between the force-receiving layer 25 and the polarizing layer 24.

In view of a longitudinal section, a length of the force-receiving layer 25 is greater than lengths of film layers positioned below it. Both ends of the force-receiving layer 25 protrude from the film layers positioned below it. An end of the force-receiving layer 25 is curled and attached to or fixed to the curling device 3, and another end of which is attached to or fixed to an inner sidewall of the side housing 12. The force-receiving layer 25 is a top layer of the flexible display screen 2 and plays a role of tightening and fixing the flexible display screen 2, to improve a flatness of the surface of the flexible display screen 2. The force-receiving layer 25 has a greater hardness, and its material is an optical-grade stretch-resistant material, which can be materials such as colorless polyimide (CPI) or poly-ethylene terephthalate (PET). The force-receiving layer 25 can reduce a phenomenon of peeling off in the flexible display screen 2 and prolong the service life of the flexible display screen 2.

A layer of thermoplastic urethane (TPU), thermoplastic polyurethane elastomer material can also be coated on an upper surface of the force-receiving layer 25. The TPU is a polymer material formed by co-reacting a diisocyanate molecule such as diphenylmethane diisocyanate (MDI) or toluene diisocyanate (TDI), macromolecular polyols, and low molecular polyols (chain extenders). Its molecular structure is alternately formed of a hard segment obtained by a reaction of diphenylmethane diisocyanate (MDI) or toluene diisocyanate (TDI) and chain extender, and soft segment obtained by a reaction of diphenylmethane diisocyanate (MDI) or toluene diisocyanate (TDI) and other diisocyanate molecules with macromolecular polyols. The TPU material is super-elastic and can protect the force-receiving layer 25 and the flexible display screen 2. At the same time, if it is damaged by the external environment, the TPU material can be directly torn off and replaced, which is convenient for replacement, maintenance, and protection.

As shown in FIG. 5 and FIG. 8, the curling device 3 includes a support plate 31, a reel 32, a guide rail 33, a sliding shaft 34, a constant-force coil spring 35, and a fixing piece 36. The curling device 3 is a main curling part of the display device of the present embodiment.

The support plate 31 is mounted in a cavity enclosed by the scrolling region 210 of the flexible display screen 2. The support plate 31 includes a first support plate 311 and a second support plate 312 which are arranged in a staggered manner. The staggered insertion arrangement means that the first support plate 311 is defined with a plurality of slots 3110, and support pieces on the second support plate 312 can be engaged into the slots 3110 and interlaced to form a dense support plate 31, which effectively improves a supporting effect of the support plate 31. An electromagnet structure 37 is disposed in the support plate 31. After the flexible display screen 2 is stretched, that is, when the second support plate 312 is pulled apart and the first support plate 311 is unfolded, the electromagnet structure 37 is energized, and the electromagnet structure 37 is configured to magnetically attract the metal plate 21, so that during a stretching and curling process, the metal plate 21 is magnetically fixed by the support plate 31 to ensure a flatness of the pattern region 211 and each layer positioned on the metal plate 21.

In the enrolled state, the first support plate 311 and the second support plate 312 are engaged with each other. At this time, the scrolling region 210 of the flexible display screen 2 does not display on a front side, and the front display region is the first display surface 230 at this time.

In the stretched state, the first support plate 311 and the second support plate 312 are unfolded. At this time, the scrolling region 210 of the flexible display screen 2 is stretched to the front side of the display screen, and display is also performed. At this time, the front display region is the second display surface 240, and the second display surface 240 includes the plane region 220 and the scrolling region 210 being stretched out.

The side housing 12 is fixed to a side of the second support plate 312 away from the first support plate 311, and a side of the flexible display screen 2 is fixed between the side housing 12 and the second support plate 312.

The reel 32 is mounted to an end of the first support plate 311, and is arranged in close contact with the sidewall 112 of the rear housing 11. A length of the reel 32 is adapted to a length of the sidewall 112, and two ends of the reel 32 are connected to the sidewall 112 through holes defined on the sidewall 112. The flexible display screen 2 is wound on the reel 32 and extends from the reel 32 to a surface of the support plate 31. A shaft of the reel 32 is rotatable to facilitate a curling and sliding of a panel of the scrolling region 210 of the flexible display screen 2.

The guide rail 33 is arranged perpendicular to the reel 32. An end of the guide rail 33 is fixed to the end of the first support plate 311 or to the rear housing 11, and the other end is fixed to the fixing piece 36. Two of the guide rails 33 are arranged in parallel, and both ends of the fixing piece 36 are respectively fixed the two of the guide rails 33 to ensure parallel arrangement and can carry the sliding shaft 34 for sliding.

The sliding shaft 34 is slidably mounted to the two guide rails 33, and a sliding of the sliding shaft 34 can drive the scrolling region 210 of the flexible display screen 2 to slide and curl.

The constant-force coil spring 35 is mounted on the sliding shaft 34, an end of which is fixed to the fixing piece 36, and the fixing piece 36 is mounted to the inner sidewall of the side housing 12. The constant-force coil spring 35 and the sliding shaft 34 are combined to realize the stretching and curling of the flexible display screen 2. During the whole process of stretching and curling, there is always a pre-tightening force to prevent the flexible display screen 2 from being upturned and uneven, so that it is always attached to the upper surface of the staggered support plate 31.

As shown in FIG. 1, FIG. 2, and FIG. 9, when the flexible display screen 2 is in the enrolled state, from a front view of the flexible display screen 2, only the plane region 220 is an effective display region. At this time, the scrolling region 210 is positioned in the reel 32 and the back of the flexible display screen 2, that is, positioned at the rear housing 11, the sliding shaft 34 and the constant-force coil spring 35 are both positioned at the fixing piece 36, and the constant-force coil spring 35 is in the enrolled state at this time.

As shown in FIG. 3, FIG. 4, FIG. 5, and FIG. 10, when the flexible display screen 2 is in the stretched and unfolded state, when viewed from the front of the flexible display screen 2, except for the plane region 220 which is the effective display region, the flexible display screen in the part of the scrolling region 210 is stretched to the front and displays together as a limited display region. At this time, part of or all of the scrolling region 210 is stretched to the front to form the effective display region. The sliding shaft 34 and the constant-force coil spring 35 gradually approach the reel 32 until they are fully attached to the reel 32, so that the display device is changed from an ordinary mobile phone to a large-area display device such as a tablet or a computer. An end of the constant-force coil spring 35 is fixed to the fixing piece 36, and the other end of the constant-force coil spring 35 slides along the guide rails 33 to the reel 32 along with the sliding shaft 34 to complete the stretching and unfolding of the scrolling region 210 of the flexible display screen 2. After the stretching is completed, the electromagnet is energized, and the support plate 31 magnetically attracts the metal plate 21 to ensure a surface flatness of the pattern region 211 and the flexible display screen 2, and further ensuring the display effect of the display device.

The combined structure of the constant-force coil spring 35 and the sliding shaft 34 is adopted to realize the stretching and curling of the flexible display screen 2. When the flexible display screen 2 is stretched outward, the sliding shaft 34 and the constant-force coil spring 35 are stretched to give the flexible display screen 2 a certain pre-tightening force and pulling force. During the curling, the constant-force coil spring 35 returns to an initial state and is automatically enrolled. Moreover, during the curling process, the flexible display screen 2 is always stretched to actively compensate for a length difference caused by an outward expansion and an enrolling, which prevents the pattern region 211 and the flexible display screen 2 from being upturned and uneven.

A tension of the constant-force coil spring 35 is adjusted according to a tension of the flexible display screen 2 when the reel 32 is in a sliding state, and the tension of the constant-force coil spring 35 is greater than or equal to the tension of the flexible display screen 2 to be flattened.

The technical effect of the display device in the present embodiment is that a combined structure of the constant-force coil spring and the sliding shaft is adopted to realize a stretching and curling of the flexible display screen. During this process, the flexible display screen is always in a tensioned state to ensure a flatness of its surface, and to ensure that it has a good display effect. The stretching of the flexible display screen enables the display device to have a large effective display region, which increases applicable scenarios of the display device, and improves a utilization rate of the display device. At the same time, the display device has a good portability in an enrolled state. A top of the flexible display screen is coated with a thermoplastic urethane (TPU) material that can be replaced and maintained at any time, which fully protects the display device from external damage.

In the above-mentioned embodiments, the description of each embodiment has its own focus. For parts that are not described in detail in an embodiment, reference can be made to related descriptions of other embodiments.

A display device provided by an embodiment of the present invention is described in detail above, and specific examples are used in the present document to illustrate the principle and implementation of the present invention. The description of the above embodiment is only used to help understand the technical solution of the present invention and its core ideas. A person skilled in the art can make various modifications and changes to the above embodiments without departing from the technical idea of the present invention, and such variations and modifications are intended to be within the scope of the invention.

What is claimed is:

1. A display device, comprising:
- a flexible display screen; and
- a curling device installed in the flexible display screen;
- wherein the flexible display screen comprises a metal plate, all or a part of the metal plate is provided with a pattern region, the metal plate is curlable in the pattern region;
- the flexible display screen corresponding to the pattern region is completely wound on the curling device or partially wound on the curling device; and
- the curling device comprises at least one guide rail arranged perpendicular to the reel; a sliding shaft slidably mounted to the at least one guide rail; a constant-force coil spring; and one fixing piece; both ends of the fixing piece are respectively fixed to two of at least one guide rail, and two of the sliding shaft are connected through the constant-force coil spring.

2. The display device according to claim 1, further comprising an electromagnet structure disposed in the curling device, wherein the metal plate is magnetic, and after the flexible display screen is stretched, the electromagnet structure is energized to magnetically adsorb and fix the metal plate.

3. The display device according to claim 1, wherein a modulus of the pattern region ranges from 0.2 MPa to 10 MPa.

4. The display device according to claim 1, wherein the curling device comprises:
- support plates comprising a first support plate and a second support plate engaged with each other in a staggered manner; and
- a reel arranged on a side of the first support plate away from the second support plate, wherein the flexible display screen is wound on the reel and extends from the reel to surfaces of the support plates;
- wherein when the first support plate and the second support plate are completely engaged with each other, the flexible display screen forms a first display surface, and when the first support plate and the second support plate are expanded mutually, the flexible display screen stretches from the reel to form a second display surface.

5. The display device according to claim 4, further comprising:
- a housing, wherein the reel is installed in the housing and is connected to the housing, the first support plate is fixed in the housing, the second support plate is slidably arranged on the first support plate, and the at least one guide rail is fixed on a side of the first support plate facing the housing or a side of the housing facing the first support plate; and
- a side housing fixed on a side of the second support plate away from the first support plate, wherein a side of the flexible display screen is fixed between the side housing and the second support plate.

6. The display device according to claim 4, wherein the flexible display screen further comprises:

a substrate disposed on a surface of the metal plate away from the curling device;

an adhesive layer disposed between the substrate and the metal plate; and a force-receiving layer disposed on a surface of the substrate away from the adhesive layer.

7. The display device according to claim 6, wherein an end of the force-receiving layer is curled and attached to the sliding shaft, and another end is attached to an inner sidewall of a side housing.

8. The display device according to claim 6, wherein the flexible display screen further comprises:

a polarizing layer.

9. The display device according to claim 6, wherein a length of the force-receiving layer is greater than lengths of film layers positioned below it in view of a longitudinal section.

10. The display device according to claim 6, wherein a material of the force-receiving layer is an optical-grade stretch-resistant material.

11. The display device according to claim 6, wherein the optical-grade stretch-resistant material is selected from colorless polyimide and poly-ethylene terephthalate.

12. The display device according to claim 11, wherein the first support plate is defined with a plurality of slots.

13. The display device according to claim 6, wherein a layer of thermoplastic urethane is coated on an upper surface of the force-receiving layer.

14. The display device according to claim 13, wherein the thermoplastic urethane is a polymer material formed by co-reacting a diisocyanate molecule, macromolecular polyols, and low molecular polyols.

15. The display device according to claim 1, wherein the constant-force coil spring is installed on the sliding shaft, and an end of the constant-force coil spring is fixed to the fixing piece.

16. The display device according to claim 1, wherein a thickness of the metal plate ranges from 0.02 mm to 5 mm.

17. The display device according to claim 1, wherein a number of openings are defined on the pattern, and shapes of the openings in each column or each row are same.

18. The display device according to claim 17, wherein a shape of each of the openings comprises a closed-loop quadrilateral and a connected quadrilateral.

19. The display device according to claim 18, wherein the connected quadrilateral is a structure in which every two adjacent quadrilaterals are connected at included angles to form an entire row of the openings.

20. The display device according to claim 1, further comprising a housing, wherein the housing comprises a rear housing and a side housing.

* * * * *